United States Patent [19]

Tregaskis

[11] Patent Number: 5,070,638
[45] Date of Patent: Dec. 10, 1991

[54] FISHING APPARATUS

[76] Inventor: Steven M. Tregaskis, 57 Lexington Drive, Worongary Queensland 4213, Australia

[21] Appl. No.: 479,989

[22] Filed: Feb. 14, 1990

[30] Foreign Application Priority Data

Feb. 15, 1989 [AU] Australia .................................. PJ2737

[51] Int. Cl.⁵ ............................................. A01K 97/12
[52] U.S. Cl. .......................................... 43/15; 43/21.2
[58] Field of Search ....................... 43/15, 16, 17, 21.2; 248/538

[56] References Cited

U.S. PATENT DOCUMENTS

| | | | |
|---|---|---|---|
| 3,285,360 | 11/1966 | Wetsch | 43/21.2 |
| 3,977,117 | 8/1976 | Zahner | 43/15 |
| 4,197,668 | 4/1980 | McKinsey | 43/15 |
| 4,202,125 | 5/1980 | Kovacs | 43/17 |
| 4,375,731 | 3/1983 | Budd | 43/21.2 |
| 4,476,645 | 10/1984 | Paarmann | 43/21.2 |
| 4,578,891 | 4/1986 | Murray | 43/21.2 |

Primary Examiner—Kurt Rowan
Assistant Examiner—Chuck Y. Mah
Attorney, Agent, or Firm—Bauer & Schaffer

[57] ABSTRACT

Apparatus for holding a fishing rod including a tubular member for receiving the end of the fishing rod, and a spring biased latch for holding the tubular member and thus the rod in an inclined attitude. In an event of a fish biting, the rod may be grasped and pivoted away from its inclined attitude so as to release the latch and permit the rod to be detached from the tubular member so that a strike can be made.

14 Claims, 4 Drawing Sheets

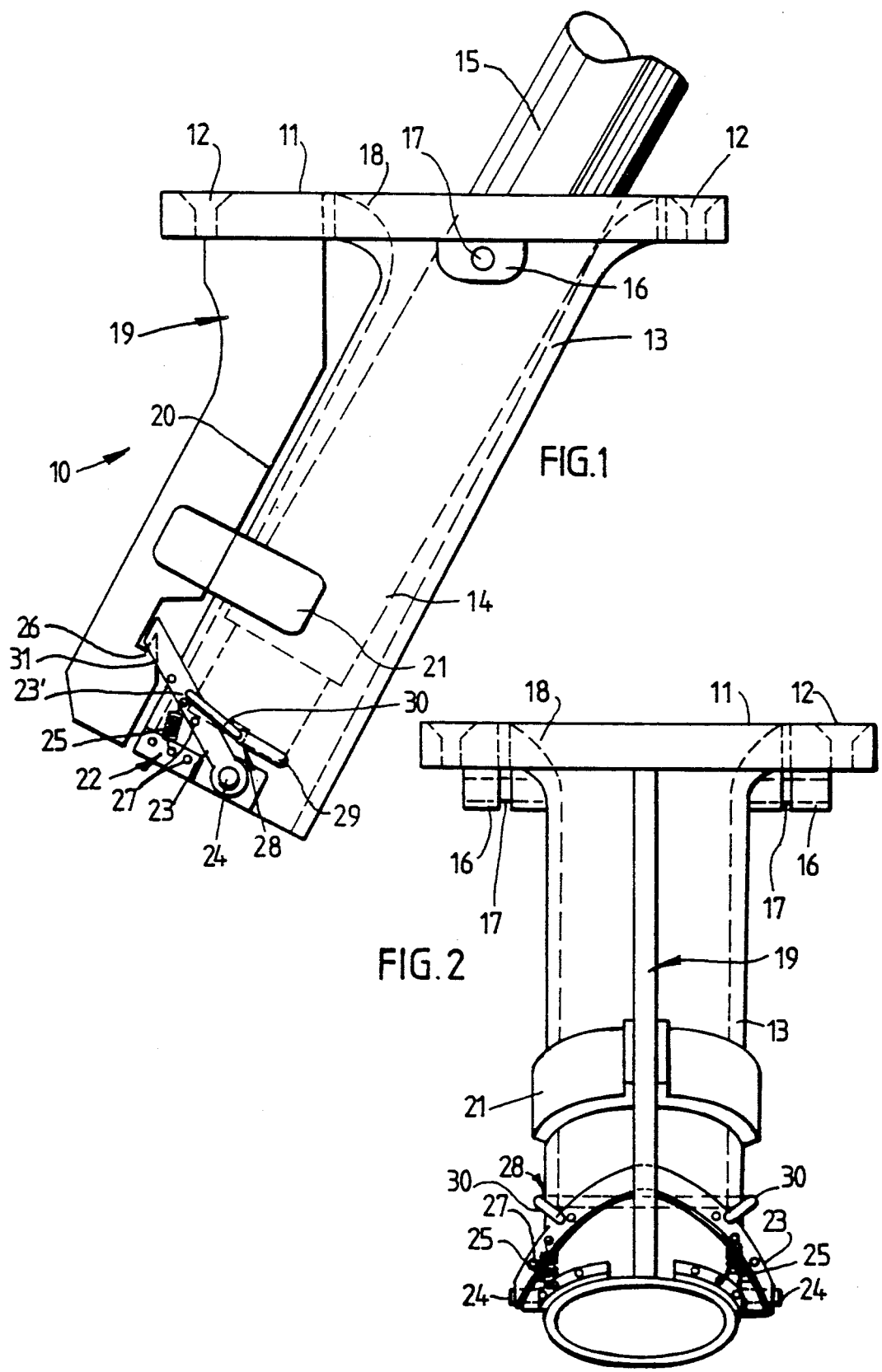

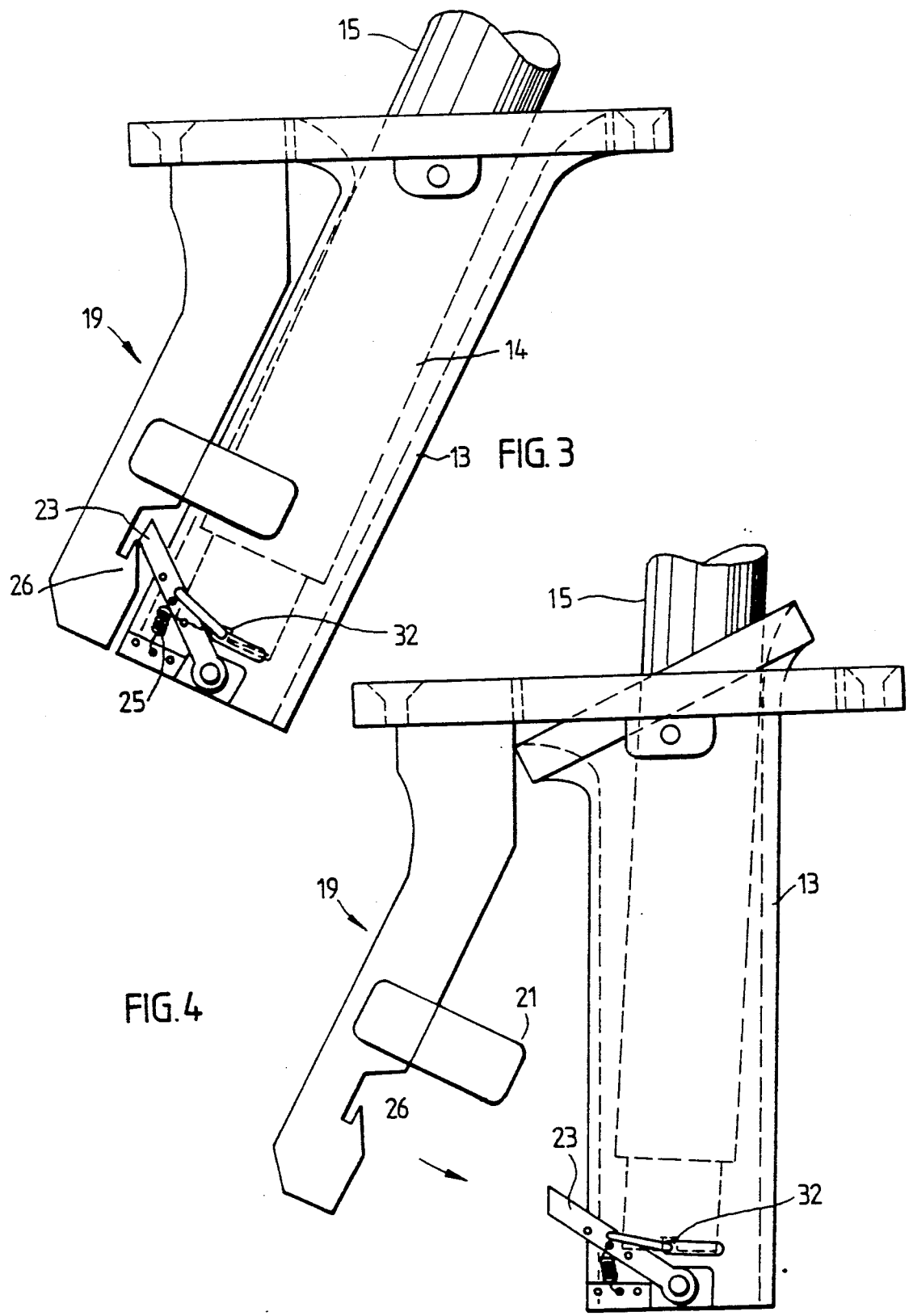

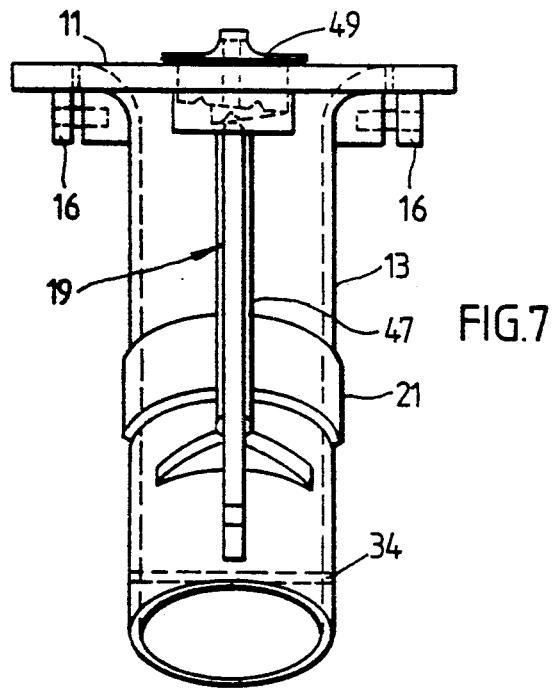
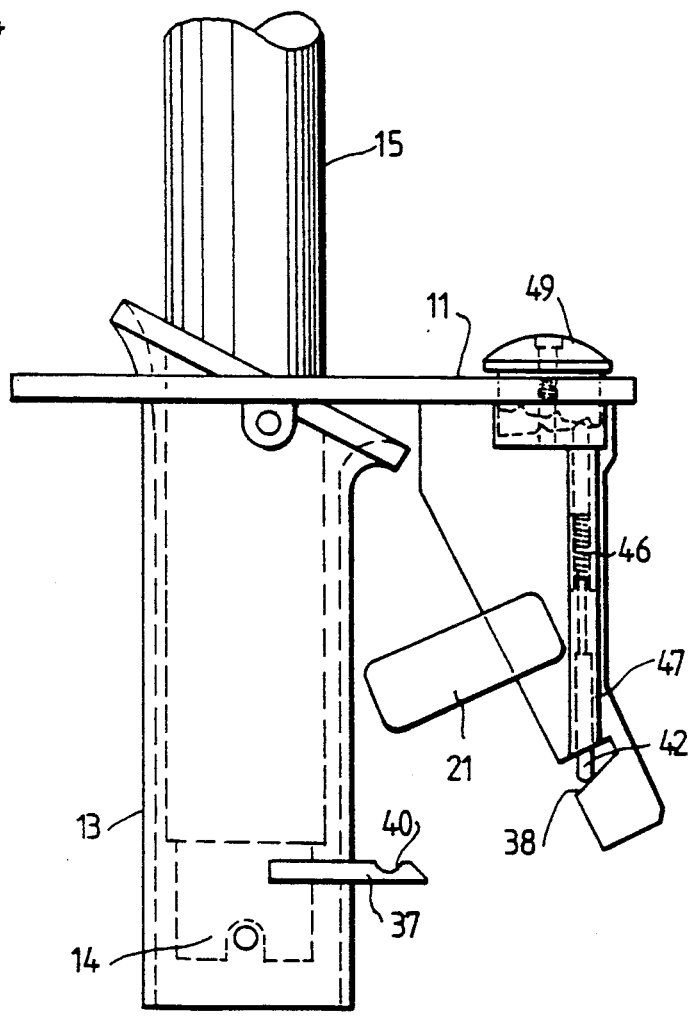

FISHING APPARATUS

FIELD OF THE INVENTION

This invention relates to improvements to fishing apparatus which has particular application to game fishing.

DESCRIPTION OF THE RELATED ART

It is common in game fishing situations to employ fishing rod holders which are normally mounted to the deck of a boat and which are of tubular form so as to receive and support a fishing rod. In most instances the butt of the rod is provided with one or more transversely extending slots or grooves which locate within a diametrical extending bar or member in the base of the tube so that the rod and the attached reel can be supported in a desired attitude. When a rod is arranged in the above manner and a fish bites it is often difficult to grasp the rod and remove it from the holder so that a strike can be made before the fish drops the bait. Furthermore in the event that a strike is made, considerable pressure is applied to the rod so that it often tends to become jammed in the holder so that removal of the rod becomes particularly difficult.

SUMMARY OF THE INVENTION

The present invention aims to overcome or alleviate the above disadvantages by providing a rod holder which is particularly suited to game fishing applications and which, when a rod is engaged therewith, permits easy detachment thereof in the case of a strike. The present invention also aims to provide a rod holder which facilitates the hooking or catching of a fish. Other objects and advantages of the invention will become apparent hereunder.

With the above and other objects in view the present invention provides in a preferred aspect rod holding apparatus for supporting a fishing rod, said apparatus including frame means, tubular support means for receiving and supporting the butt of a fishing rod, means for pivotally mounting said tubular support means on said frame means for movement about an axis extending transversely of said support means, releasable biased latch means for maintaining said tubular support means in a first inclined attitude for supporting a said rod for fishing, and said latch means being releasable to permit said support means to pivot away from said first attitude when a predetermined force is applied to said latch means sufficient to overcome said bias thereof.

The apparatus suitably includes stop means for limiting pivotal movement of said tubular support means about said axis in a first direction, and preferably said releasable latch means is provided between said tubular support means and said stop means. The stop member preferably includes an inclined portion defining the required inclination of said tubular support means and said latch means normally holds said tubular support means adjacent said inclined portion.

Preferably, said latch means includes a latch member on said tubular support means and cooperative means engageable with said latch member on said stop member. Suitably said latch member is fixed for movement with said tubular support means and said cooperable means includes spring biased detent means. Preferably means are provided for selectively varying the spring force applied by said spring biased detent means. Suitably said spring biased detent means comprise first and second pins and spring means biasing said pins apart, one said pin being arranged to engage said latch member and the other said pin being arranged to engage an adjustment member selectively operable to vary the compression of said spring means between said pins.

Alternatively, said cooperative means comprises hook means on said stop member adapted to be engaged by said latch member and said biasing of said latch means is are operative to urge said latch member into engagement with said hook means. Release means are suitably provided for releasing said latch member from said hook means, said release means being operative to move said latch member against the bias of said latch means. The release means may comprise means in said tubular support means engageable by said butt of said fishing rod, said release means releasing said latch member from said hook means when said rod is moved in a direction away from said inclined attitude of said tubular support means to an extent to overcome the force applied by said bias of said latch means.

BRIEF DESCRIPTION OF THE DRAWINGS

In order that the invention may be more readily understood and put into practical effect reference will now be made to the accompanying drawings which illustrate a preferred embodiment of the invention and wherein:

FIG. 1 is a side elevational view of the apparatus of the invention;

FIG. 2 is an end elevational view of the apparatus of FIG. 1;

FIG. 3 illustrates the attitude of the apparatus of FIG. 1 upon release of the latch;

FIG. 4 illustrates an alternative position of the apparatus permitted by latch release.

FIG. 7 is an end elevational view of the apparatus of FIG. 5; and

FIG. 8 is a further side elevational view showing the apparatus in a released attitude.

DETAILED DESCRIPTION OF THE INVENTION

Figures 5, 6:
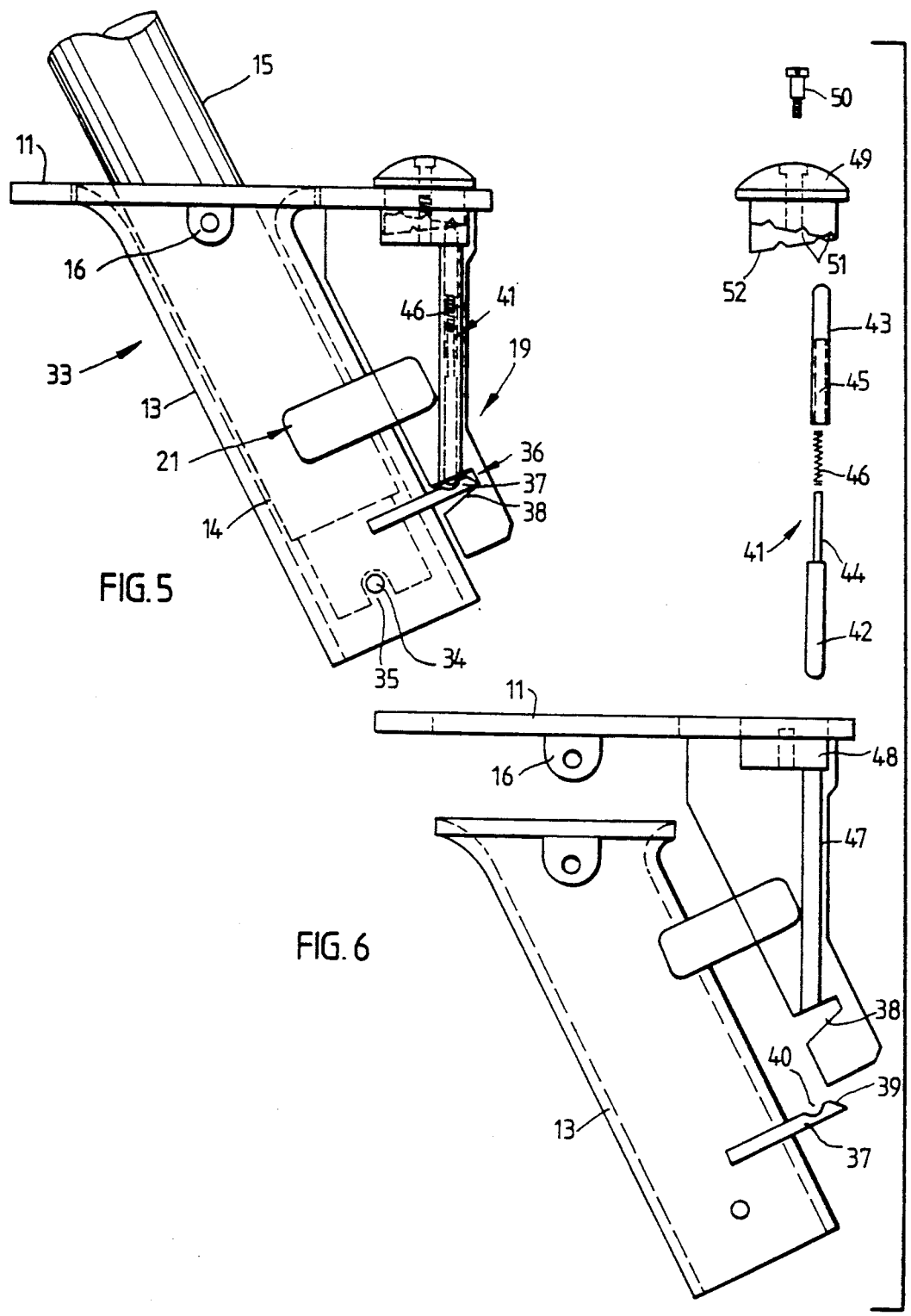
FIG. 5 is a side elevational view of a further form of rod holding apparatus according to the present invention.
FIG. 6 is an exploded view showing the components of the apparatus of FIG. 5.

Referring to the drawings and firstly to FIG. 1 there is illustrated rod holding apparatus 10 according to the present invention adapted to be mounted to the deck of a water craft and including for this purpose a supporting frame comprising a planar deck mounting member or plate 11 provided with holes 12 therethrough which permit the securing of the apparatus 10 to the deck of a water craft and to, if desired, a backing plate located on the underside of the deck. Pivotally mounted to the deck mounting plate 11 and extending on the lower side thereof is a rod supporting tube 13 which is sized to receive the butt 14 of a fishing rod 15 and permit movement of the butt therein as described below.

The plate 11 includes on its underside and on opposite sides of the tube 13 a pair of lugs 16 which are apertured to receive respective pivot pins 17 which extend outwardly from the tube 13 so that the rod is pivotally supported for movement about a transverse axis. As shown in FIGS. 1 and 2 the tube 13 is normally arranged at an angle inclined to the vertical and the upper end of the tube 13 is flared outwardly at 18 so as to facilitate engagement of a rod therewith. It will also be apparent that the tube flare is such to terminate flush with the upper edge of the deck mounting plate 11.

Also secured to the plate 11, for example by being integrally formed therewith is a stop member 19 which includes a portion 20 inclined to the vertical and defining the required normal inclination of the rod 15 and adjacent to which the tube 13 is normally held. The stop member 19 also comprises a brace for taking loads applied to the tube 13 tending to cause the tube 13 to undergo pivotal movement in the clockwise direction, for example in the event that a loading is applied to the rod 15 consequent upon say a fish taking a bait. The stop member 19 also includes an arcuate brace 21 which extends partly around the rod 15 on opposite side thereof to support the sides of the tube 13 and guide the tube 13 back to the position shown in FIG. 1 in the manner described below.

At the base of the tube 13, a pivotal latch 22 is provided, the latch 22 being in the form of an arcuate member 23 pivotally mounted by means of pivot pins at 24 to opposite sides of the tube 13 and being biased downwardly by springs 25 into engagement with a hook 26 provided on the stop 19. Preferably adjustment holes 27 are provided so as to permit variation in the spring bias applied to the latch member 23.

The release mechanism for the latch 22 comprises a release pin 28 which extends radially of the tube 13 and through elongated slots 29 on opposite sides of the tube 13 so as to be movable transversely of the tube 13. The release pin 28 is turned over at its opposite ends at 30 and engages with apertures in the latch member 23. It will thus be apparent that movement of the release pin 28 along the slots 29 will cause the latch member 23 to pivot upwardly and out of engagement with the hook 26. This will thereby release the tube 13 from the position of FIG. 1. The hook 26 is also ramped at 31 on its side adjacent the rod supporting tube 13 so that the latch member 23 will ride up thereover and re-engage the hook 26 when the tube 13 is pivoted clockwise back to its normal position shown in FIG. 1.

In use a fishing rod 15 is located with its butt 14 within the tube and the normal transverse slot or groove 32 in the butt 14 engaged over the release pin 28 in the manner shown in FIG. 1. In the event that the bait is taken it is often necessary to strike before the bait is dropped by the fish and to do this it is important that access to the rod 15 be gained quickly and a force applied against the pull of the fish so as to ensure hooking thereof. This is achieved by grasping the rod 15 and pivoting it in an anti-clockwise direction. This movement within the tube 13 causes retraction of the pin 28 within the slots 29 and consequent clockwise pivotal movement of the latch member 23 against the force applied by the bias of the springs 25 as shown in FIG. 3. When the latch member passes over the hook 26 the tube 13 will be released from the stop 19 and be permitted to pivot anti-clockwise (see FIG. 4). Thus any tension on the fishing line can be counteracted so as to improve the chances of obtaining a strike. Furthermore, it will be apparent in the FIG. 4 position that the rod 15 is not fouling or jammed against the tube 13 so that it may be readily axially detached therefrom.

After the tube 13 is moved to its FIG. 4 position and it is desired to reset the holder, it is a simple matter to pivot the tube clockwise so that the latch member 23 rides up over the ramp 31 of the hook 26 to re-engage same and hold the tube 13 in the FIG. 1 attitude. The braces 21 assist in guiding the tube 13 to this attitude and help support the tube 13 against lateral movement.

Many different latching arrangements may be provided for maintaining the tube 13 in its inclined operative attitude of FIG. 1 and for permitting release of the tube 13 for pivotal movement. For example a spring loaded latch may be provided on the side of and externally of the tube 13 and provided with a trigger engageable by the rod 15 when it is desired to release the latch. Alternatively, the bias applied to the latch 23 may be achieved by the inherent resilience in the latch 23, the latch 23 for this purpose being fixed to the tube 13 at say the point 24 and being urged towards a latched position by virtue of its resilience, such resilience being overcome when the rod 15 is moved to the FIG. 3 position to lift the latch 23 clear of the hook 26.

The rod holding apparatus 33 shown in FIGS. 5 to 8 has many features in common with the embodiment of FIGS. 1 to 4 and accordingly like features will be given like numerals. This apparatus 33 as before includes a deck mounting plate 11 provided with a pair of lugs 16 which pivotally support a rod holding tube 13 which is sized to receive the butt 14 of a fishing rod 15. The plate 11 also includes as before a stop member 19 including an inclined portion 20 which is angled at the desired inclination of the rod 15. The stop member 19 also includes an arcuate brace 21 which extends partly around the rod holding tube 13 to support the sides of the tube. The tube 13 further includes a transversely extending fixed pin 34 upon which the butt 14 of the rod 15 sits, the butt 14 for this purpose being provided with a groove 32 for location over the pin 34.

A latch assembly 36 is provided for normally holding the rod supporting tube 13 in an inclined attitude adjacent to the member 19, the latch assembly 36 including a latch member 37 fixed to the tube 13 and adapted to extend into a slot 38 in the stop member 19. The latch member 37 is provided with a leading tapered end 39 and a dimple 40 rearwardly of the end 39 which is adapted to be engaged by a spring biased detent assembly 41 so as to normally hold the rod supporting tube 13 in its inclined attitude. The detent assembly 41 as more clearly shown in FIG. 6 includes first and second cooperative pins 42 and 43, one pin 42 being provided with a reduced diameter shaft 44 adapted to extend into a bore 45 in the other pin 43 and hold captive therein a coiled spring 46, the latter serving to urge the pins 42 and 43 apart.

The stop member 19 is provided with an elongated bore 47 adapted for freely receiving the detent assembly 41, the bore 47 intersecting the slot 38 at one end and terminating offcentre of a circular recess 48 which is formed in the plate 11 and upper end of the stop member 19. Mounted in the recess 48 is a rotatable adjustment member 49 which is secured by means of a screw 50 for rotation within the recess 48 and which is provided with a series of grooves 51 on its underside adapted for engagement with the end of the pin 43, the grooves 51 being arranged at a circumferential spacing to each other and along a camming surface 52 on the underside of the member 49.

In use the rod holding tube 13 is moved to the position of FIG. 5 wherein the latch member 37 is arranged within the recess 38 and engaged by the spring biased detent assembly 41 so that the tube 13 is maintained in the FIG. 5 position. If greater or less bias is desired to be applied by the detent assembly 41, the member 49 may be rotated by hand in opposite directions, the spring 46 urging the rounded end of the pin 43 against the camming surface 52 and causing the end to ride into the respective grooves 51 along the camming surface 52. This will urge the pins 42 and 43 relatively towards each other or permit the pins 42 and 43 to move away from each other to thereby vary the compression of the spring and thus the loading applied by the detent assembly 41 on the latch member 36 and thus the holding force on the latch member 36. Movement of the rounded end of the pin 43 into the respective grooves 51 will also hold the member 49 in set positions as determined by the grooves 51 due to the force applied by the spring 46.

The force applied by the detent assembly 41 may thus be "dialled up" to the required level. This is important to suit different fishing requirements. Thus in situations where marlin fishing is being undertaken and large lures are being used, a higher spring force is applied by the detent assembly on the latch so that the lure will not cause the latch to be inadvertently unlatched. In calmer conditions where smaller lures are used for different typed of fishing, less spring force will be required to be applied by the detent assembly.

In the event of a bite by a fish, the rod 15 is grasped and pivoted clockwise by hand. The rounded end of the pin 42 permits the pin 42 to move out of the dimple 40 when sufficient clockwise force is applied to the tubes 13 to counteract the force of the spring 46. The tube 13 may be thus moved to the position of FIG. 6 so that the rod 15 may be readily lifted from the holding apparatus to facilitate a strike.

The rod holding tube 13 may then be pivoted back to the position of FIG. 5 so that the latch member 37 is again engaged by the detent assembly 41, this being facilitated by the tapered end of the latch member 37 which will cause the end of the pin member 42 to lift up and locate in the dimple 40 as the tube 13 is pivoted anticlockwise towards the stop member 19.

In an alternative simplified embodiment of the invention, the arcuate brace 21 may be extended about the tube 13 to act as a resilient latch which engages about the tube 13 to hold the tube 13 in an inclined attitude but which permits the tube 13 to be released from that attitude when subject to a sufficient force which will overcome the resilience of the latch.

The components of the apparatus 10 and apparatus 32 may be constructed of any suitable material and preferably of brass, aluminium or stainless steel so as to suit marine environments. Alternatively the rod holding apparatus of the invention may be constructed of a plastics material.

The present invention is particularly suited to use on the deck of a watercraft such as a boat with the deck mounting plate 11 being substantially flush with the deck of the watercraft and the rod holding tube 13 and associated latching mechanism being disposed below the deck so as not to present any obstruction on the deck.

Whilst the above has been given by way of illustrative embodiment of the invention all such variations and modifications thereto as would be apparent to persons skilled in the art are deemed to fall within the broad scope and ambit of the invention as herein defined in the appended claims.

I claim:

1. Rod holding apparatus for supporting a fishing rod, said apparatus including frame means including a deck mounting member for mounting said apparatus to the deck of a water craft, elongated rod supporting means for receiving and supporting the butt of a fishing rod, means for pivotally mounting said rod supporting means to said deck mounting member for movement about an axis extending transversely of said rod supporting means, said rod supporting means being located on one side of said deck mounting member whereby to extend below said deck of said water craft, releasable latch means between said frame means and said rod supporting means for maintaining said rod supporting means in a first inclined attitude for supporting a rod for fishing, said latch means including a latch member fixed for movement with said rod supporting means and spring biased detent means on said frame means and engageable with said latch member, said latch member being releasable from said detent means upon a predetermined force being applied thereto sufficient to overcome the bias of said spring biased detent means whereby to permit said rod supporting means to be freely pivoted about said axis away from said first inclined attitude, said spring biased detent means comprising first and second pins and spring means biasing said pins apart, one said pin being arranged to engage said latch member and the other said pin engaging an adjustment member selectively operable to vary the compression of said spring means between said pins and thereby said predetermined force required to release said latch member from said detent means.

2. Rod holding apparatus according to claim 1 and wherein said frame means includes stop means for limiting pivotal movement of said rod supporting means about said axis in a first direction, beyond said inclined attitude and wherein said releasable latch means is provided between said rod supporting means and said stop means.

3. Rod holding apparatus according to claim 2 wherein said stop means includes an inclined portion defining said inclined attitude of said rod supporting means and wherein said latch means normally holds said rod supporting means adjacent said inclined portion.

4. Rod holding apparatus according to claim 2 wherein said latch means includes a latch member on said rod supporting means and co-operable means engageable with said latch member on said stop means.

5. Rod holding apparatus according to claim 4 wherein said co-operable means comprises hook means on said stop member adapted to be engaged by said latch member.

6. Rod holding means according to claim 1 wherein said pins are disposed within a bore for movement therein and wherein said adjustment member includes a camming surface contacting said other pin, said adjustment member being rotatable to vary compression of said spring means.

7. Rod holding apparatus for supporting a fishing rod, said apparatus including frame means including a deck mounting member for mounting said apparatus to the deck of a water craft, elongated rod supporting means for receiving and supporting the butt of a fishing rod, means for pivotally mounting said rod supporting means to said deck mounting member for movement about an axis extending transversely of said rod supporting means, said rod supporting means being located on one side of said deck mounting member whereby to extend below said deck of said water craft, releasable latch means between said frame means and said rod supporting means for maintaining said rod supporting means in a first inclined attitude for supporting a rod for fishing, said latch means including a latch member on said rod supporting means, hook means on said frame means adapted to be engaged by said latch member, and biasing means for urging said latch member being releasable from said hook means upon a predetermined force being applied thereto sufficient to overcome said biasing means and release means for releasing said latch member from said hook means, said release means being operative to move said latch member against the bias of said biasing means whereby to permit said rod supporting means to be freely pivoted about said axis away from said first inclined attitude.

8. Rod holding apparatus according to claim 7 wherein said release means includes means in said rod supporting means engageable by said butt of said fishing rod, said release means releasing said latch member from said hook means when said rod is moved in a direction away from said inclined attitude of said rod supporting means.

9. Rod holding apparatus according to claim 7 wherein said rod supporting means is tubular and is flared outwardly at its end adjacent said deck mounting member.

10. Rod holding apparatus for supporting a fishing rod, said apparatus including frame means, rod supporting means including a tubular support portion for receiving and supporting the butt of a fishing rod, means for pivotally mounting said rod supporting means on said frame means for movement about an axis extending transversely of said tubular support portion, releasable latch means for maintaining said tubular support means in a first inclined attitude for supporting a said rod for fishing, biasing means associated with said latch means for applying a bias thereto, said latch means being releasable to permit said support means to pivot away from said first attitude when a predetermined force is applied to said latch means sufficient to overcome the bias of said biasing means, said latch means including a latch member fixed for movement with said rod supporting means, and co-operable means engageable with said latch member on said frame means, said co-operable means comprising spring biased detent means comprising said biasing means, said spring biased detent means comprising first and second pins and spring means biasing said springs apart, one said pin being arranged to engage said latch member and the other said pin being arranged to engage an adjustment member selectively operable to vary the compression of said spring means between said pins and thereby said predetermined force required to release said latch means.

11. Rod holding apparatus according to claim 10 wherein said frame means includes stop means for limiting pivotal movement of said rod supporting means about said axis in a first direction, and wherein said releasable latch means is provided between said rod supporting means and said stop means.

12. Rod holding apparatus according to claim 11 wherein said stop means includes an inclined portion defining the required inclination of said rod supporting means and wherein said latch means normally holds said rod supporting means adjacent said inclined portion.

13. Rod holding apparatus for supporting a fishing rod, said apparatus including frame means, rod supporting means including a tubular support portion for receiving and supporting the butt of a fishing rod, means for pivotally mounting said rod supporting means on said frame means for movement about an axis extending transversely of said tubular portion, releasable latch means for maintaining said tubular support means in a first inclined attitude for supporting a said rod for fishing, biasing means associated with said latch means for applying a bias thereto, said latch means being releasable to permit said support means to pivot away from said first inclined attitude when a predetermined force is applied to said latch means sufficient to overcome the bias of said biasing means, said latch means including a latch member on said rod supporting means and cooperable hook means engageable by said latch member on said frame means, said biasing means of said latch means being operative to urge said latch member into engagement with said hook means and release means for releasing said latch member from said hook means, said release means being operative to move said latch member against the bias of said latch means.

14. Rod holding apparatus according to claim 13 wherein said releasing means includes means on said rod supporting means engageable by said butt of said fishing rod, said release means releasing said latch member from said hook means when said rod is moved in a direction away from said inclined attitude of said rod supporting means.

* * * * *